US005463982A

United States Patent [19]
Murphy

[11] Patent Number: 5,463,982
[45] Date of Patent: Nov. 7, 1995

[54] WASTE REMOVAL DEVICE

[76] Inventor: Edward J. Murphy, 3126 N. 81st St., Milwaukee, Wis. 53222

[21] Appl. No.: 288,933

[22] Filed: Aug. 10, 1994

[51] Int. Cl.$^6$ .................................................. A01K 29/00
[52] U.S. Cl. ................................................................ 119/166
[58] Field of Search .................................. 119/165, 166; 294/55, 1.3; 209/417, 418, 419, 235

[56] References Cited

U.S. PATENT DOCUMENTS

| | | | |
|---|---|---|---|
| 97,025 | 11/1869 | Bencus | 209/418 |
| 902,954 | 11/1908 | Felty | 209/419 |
| 4,217,857 | 8/1980 | Geddie | 119/165 |
| 4,224,751 | 9/1980 | Schoemann et al. | 294/55 X |
| 4,312,295 | 1/1982 | Harrington | 719/1 |
| 4,325,822 | 4/1982 | Miller | 209/251 |
| 4,505,226 | 3/1985 | Carlson | 119/1 |
| 4,553,671 | 11/1985 | Cheesman | 106/611 |
| 4,615,300 | 10/1986 | McDonough | 119/1 |
| 4,771,731 | 9/1988 | Derx et al. | 119/1 |
| 4,802,442 | 2/1989 | Wilson | 119/166 |
| 4,832,228 | 5/1989 | Hickey | 220/408 |
| 5,012,765 | 5/1991 | Naso et al. | 119/166 |
| 5,101,771 | 4/1992 | Goss | 119/173 |
| 5,158,042 | 10/1992 | Hammerslag et al. | 119/167 |
| 5,220,886 | 6/1993 | Hyde | 119/165 |
| 5,303,675 | 4/1994 | Van Den Bergh | 119/165 |
| 5,320,064 | 6/1994 | Selstad | 119/17 |
| 5,341,763 | 8/1994 | Bondurant, III | 119/166 |
| 5,347,950 | 9/1994 | Kasbo et al. | 119/171 |

OTHER PUBLICATIONS

U.S. Official Gazette entry for U.S. Pat. D. 351,489, issued to Helfrick on Oct. 11, 1994 from U.S. application Ser. No. 2,982 filed on 24 Dec. 1992.
"Amazing Tabby Tender," Dualle Products, 2 pages.
"The Container Store Closet Planning Guide," The Container Store, 1989.

*Primary Examiner*—Gene Mancene
*Assistant Examiner*—Thomas Price
*Attorney, Agent, or Firm*—Guy McClung

[57] ABSTRACT

A waste removal device has been developed which in one aspect has a reticulated grid or mesh structure for the passage therethrough of litter material and for the retention thereon of either animal waste deposited on or in the litter or waste/litter agglomerates formed upon contact of agglomerating litter with animal waste. Such an apparatus may have a plate or blade end to facilitate its insertion into a mass of litter and one or more side walls or handles for ease of manipulation. A tapered pointed lip is on the blade end of certain embodiments. One or more weights may be placed on or formed of the apparatus or of the reticulated structure to inhibit up-thrust of a mass of litter material.

2 Claims, 4 Drawing Sheets

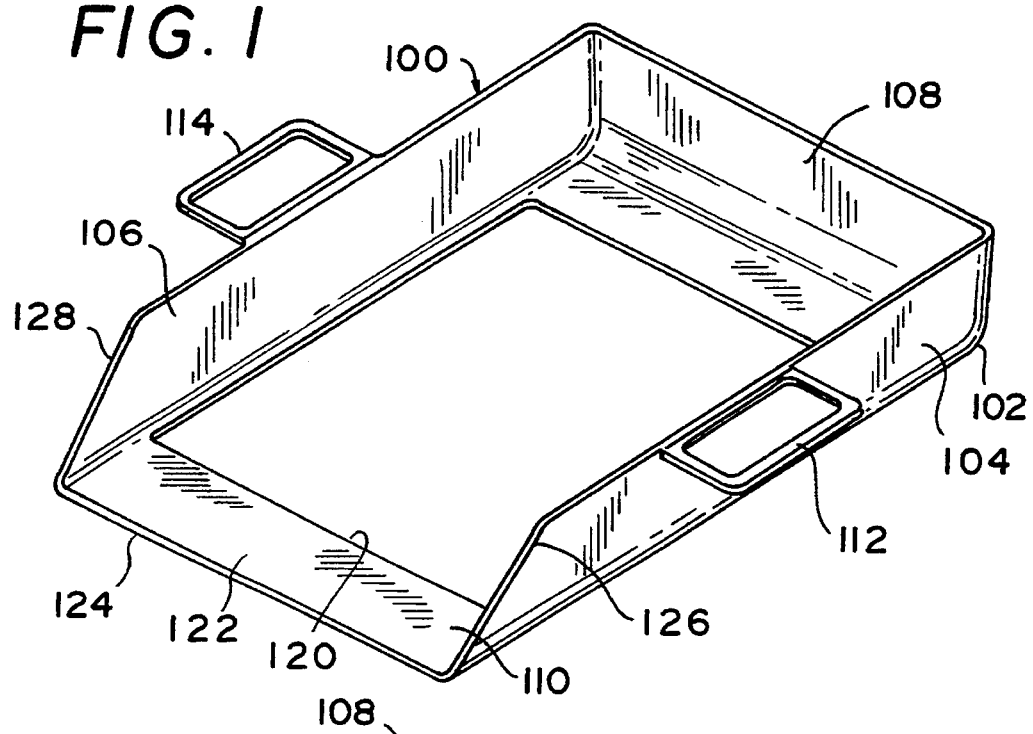
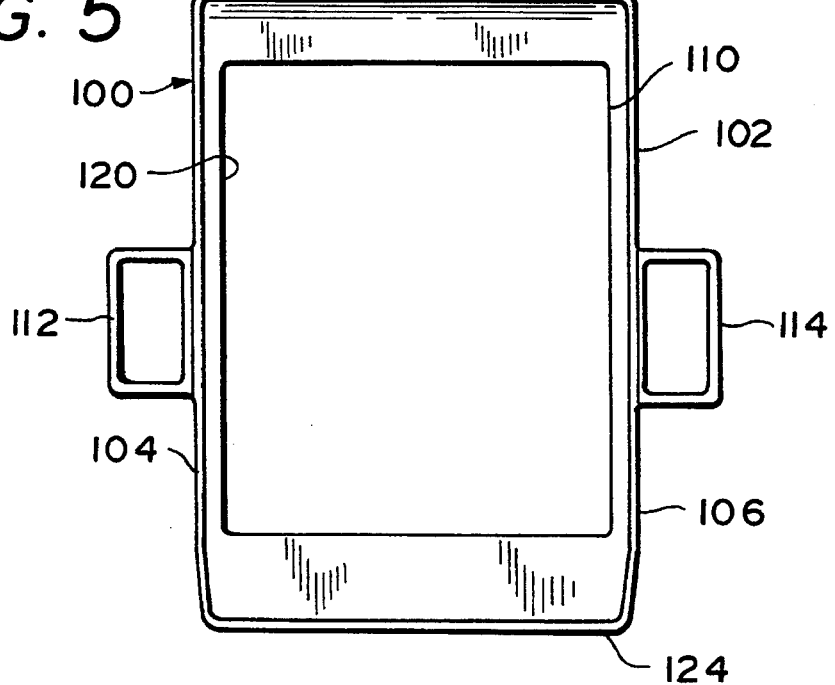
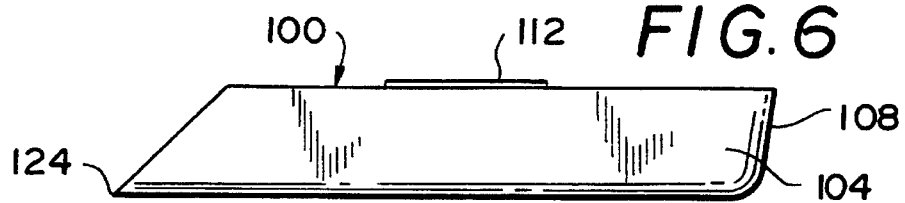

WASTE REMOVAL DEVICE

BACKGROUND OF THE INVENTION

1. Field of the Invention

This invention is directed to apparatus for removing animal waste from a container and for removing clumped waste-litter agglomerates from a litter mass and, in one aspect, to such apparatus with an open end to facilitate emplacement in a litter mass.

2. Description of Related Art

The prior art reveals a variety of animal litter substances which agglomerate or "clump up" when contacted by animal waste, e.g. U.S. Pat. No. 5,101,771 discloses such substances. The prior art also discloses a variety of containers for such animal litter substances and litter boxes; e.g. U.S. Pat. Nos. 4,325,822; 5,012,765; 4,615,300; 4,217,857; 4,312,295; 5,158,042; 5,320,064; 4,771,731; 5,220,886; 4,505,226; 4,832,228; 4,553,621.

A problem is encountered in the removal of the clumped-up litter/waste agglomerate from the remainder of un-agglomerated material. One method of dealing with the problem is simply the wasteful disposal of all of the material. Another solution involves scooping out the clumped-up litter/waste agglomerate, e.g. with a shovel or other implement, but this can also result in the considerable waste of un-agglomerated material. Another problem is the difficulty encountered in emplacing a box or screen into a mass of litter.

There has long been a need for an effective and efficient apparatus for removing animal waste from a container and for removing clumped-up litter/waste agglomerate from a mass of clumping litter material. There has long been a need for such apparatus which is easily emplaceable in such a mass of litter material.

SUMMARY OF THE PRESENT INVENTION

The present invention, in one embodiment, discloses an apparatus for removing clumped-up litter/waste agglomerate from a mass of litter material, the apparatus in one aspect including a reticulated structure with a plurality of openings therethrough for disposition within the mass of litter beneath a surface of the mass and a handling device or devices connected to the reticulated structure to facilitate removal of the reticulated structure from the mass of litter. When animal waste is deposited on the litter mass and clumps of litter and waste are agglomerated in the mass, lifting the reticulated structure allows the un-agglomerated litter to fall through the openings while the litter/waste agglomerates remain on top of the reticulated structure. This reticulated structure may be releasably securable to or formed integrally of a holding framework or box structure, preferably with one open side or end. Typically in one embodiment the reticulated structure is a mesh of criss-crossed fibers, rods, filaments or wires forming a plurality of openings with a largest dimension of about a half inch.

In another embodiment such an apparatus includes a box with three side walls and one open side, an open top, and a bottom comprising the previously described reticulated structure across its bottom. At the bottom of the open side of the box is a plate, flat member, or lip which facilitates emplacement of the box sideways into a mass of litter (rather than a more difficult emplacement from above which requires pressing the reticulated structure downwardly with the mass which, although within the scope of this invention, is not preferred).

In one embodiment substantially all of the bottom of the apparatus or box is made of a reticulated open grid, network or mesh material which is either secured to or formed integrally of the bottom of the apparatus. In another embodiment one or more weight members is removably emplaced on or formed integrally of the bottom of the apparatus or box to inhibit a tendency of a mass of litter material in a container to push the mass's center upwardly. In one embodiment two weights are used, one at each end of a reticulated structure in a rectangular apparatus.

In one embodiment this invention discloses an animal waste removal apparatus which is useful with any fine grained litter material whether it is of the waste-agglomerating type or not. A screen or reticulated structure is used of sufficiently small mesh size to permit the fine-grained litter (e.g. but not limited to sand) to flow downwardly through the apparatus, while retaining animal waste on top of the screen or reticulated structure. In certain aspects the previously described handles, etc. and flat plate or lip etc. are incorporated into such a waste removal apparatus.

In certain embodiments the reticulated structure is a separate member releasably secured to or removably emplaced in a framework, box support or handle structure. In other embodiments, either the entire apparatus or the reticulated structure is made from disposable and/or environmentally safe material and/or substances, including but not limited to certain plastics, cardboard, fiberboard and paper.

It is, therefore, an object of at least certain preferred embodiments of the present invention to provide:

New, useful, unique, efficient, non-obvious devices and methods for removing waste and waste/litter agglomerates from a mass of litter;

Such devices with structure for facilitating sideways emplacement into a litter mass;

Such devices with one or more handles or open slots for easy manual grasping or holding;

Such devices in which a screen or reticulated bottom member is releasably secured to or removably securable in a framework, box, or other structure or with one or more handles removably secured thereto or formed therein; and Such devices with one or more weights to inhibit or prevent central upward thrust of a litter mass in which the device is emplaced.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention should be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 1 is a perspective view of a waste removal device according to the present invention.

FIG. 5 is a bottom view of the device of FIG. 1.

FIG. 6 is a side view of one side of the device of FIG. 1. The other side is a mirror image of this side.

DESCRIPTION OF EMBODIMENTS PREFERRED

Figure 2:
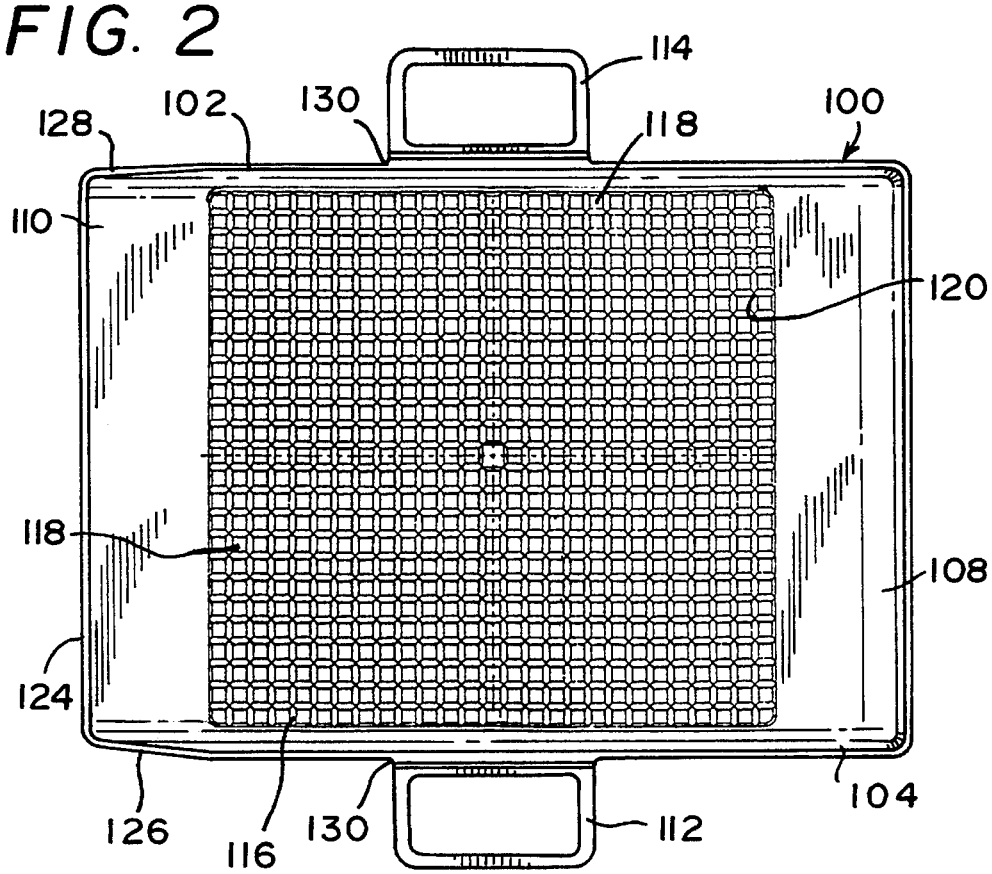
FIG. 2 is a top view of the device of FIG. 1.
Figure 3:
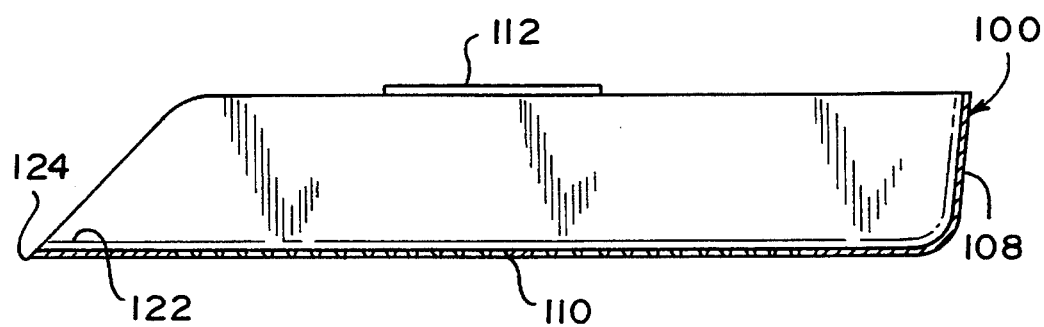
FIG. 3 is a side cross-sectional view of the device of FIG. 1.
Figure 4:
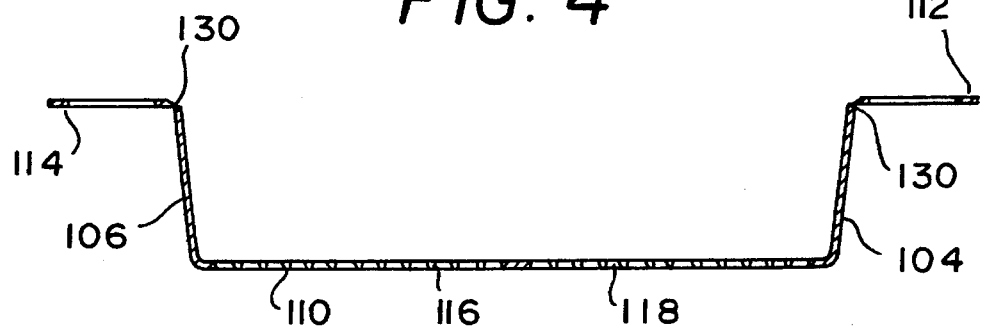
FIG. 4 is a side view of the device of FIG. 1.

FIGS. 1–6 show a device 100 according to the present invention which has a body member 102 with two opposed side members 104 and 106 spaced apart by an end member 108 and a bottom member 110. Each side 104, 106 has a handle 112, 114 respectively secured thereto or formed integrally thereof.

A reticulated structure 116 (FIG. 2) with multiple openings 118 is removably securable (e.g. by friction fit) in a recess 120 of the bottom member 110. An end 122 of the bottom member 110 has a tapered, pointed lip 124 which facilitates emplacement of the device 100 into a litter mass. Tapered ends 126, 128 of the sides 104, 106, respectively, also facilitate such emplacement.

Each handle may have a flexible hinge-like member 130 so that the handles are movable with respect to their respective side members 104, 106.

Figure 7:
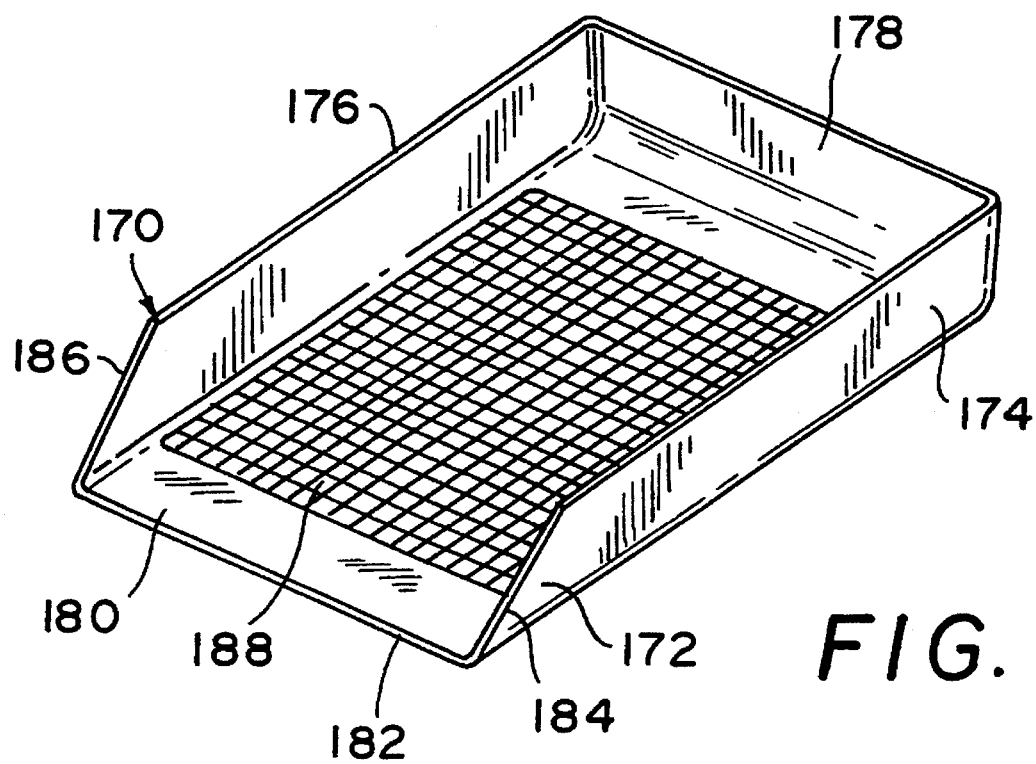
FIG. 7 is a perspective view of a waste removal device according to the present invention.

FIG. 7 illustrates another embodiment 170 of a device according to the present invention which is similar to the previously-described device 100, but which has a web-like structure 188 formed integrally of a body member 172 and which has no handles. But for these two differences the various views of the device 170 are like the various views of the device 100 shown in FIGS. 2–6. In one embodiment the device 170 is a single unitary plastic structure with an end member 178; two opposed sides 174, 176; and a bottom member 180 with a tapered, pointed end 182. Each side 174, 176 has a tapered end 184, 186 respectively.

Figure 9A:
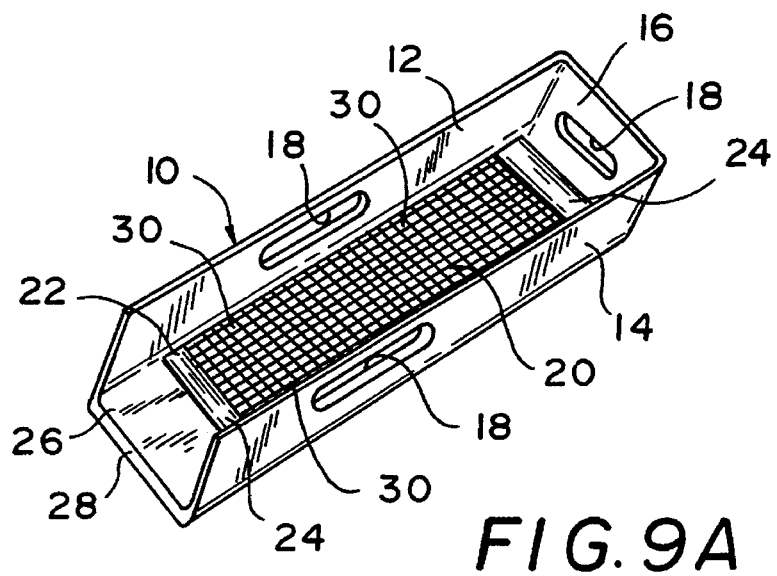
FIG. 9 is a perspective view of another waste removal device according to the present invention.
Figure 9B:
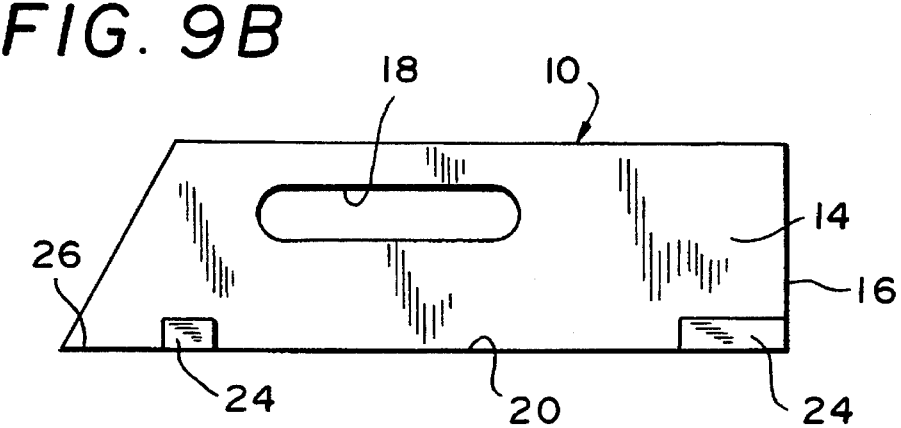

Referring now to FIG. 9, a waste removal apparatus 10 has two opposed side walls 12 and 14 with an end wall 16 interconnected therebetween. A slot 18 is cut out of each wall to facilitate grasping of the apparatus, emplacement of it in a mass of litter, and upward removal of it therefrom. A bottom 22 of the apparatus 10 comprises a reticulated structure 20, weight members 24 and an end plate member 26.

As shown, the weight members 24 are solid weights on the reticulated structure 20. Of course it is within the scope of this invention for the weight (one or a plurality of weights) to secured to the reticulated structure 20 or some other part of the apparatus or for it to be formed integrally of the apparatus or of the reticulated structure.

The plate member 26 has a tapered outer edge 28 which facilitates the entry of the plate member 26 and hence the entire apparatus into a mass of litter, e.g. sideways rather than directly from above. A plate member 26 of sufficient size and/or density may also serve as a weight member or as an additional weight member.

Preferably the reticulated structure 20 has a plurality of openings 30 which are sized to allow pieces, particles, or grains of litter material to pass through and to hold waste thereon without its passage therethrough. In one aspect the openings are sized to prevent the passage therethrough of waste/litter agglomerations when the litter is of the type that agglomerates when contacted by animal waste. In one embodiment the openings have a largest dimension of about a half inch.

The reticulated structure 20 as shown in FIG. 9 is formed integrally of the apparatus 10 and the apparatus 10 is a single unitary piece. It is within the scope of this invention for the reticulated structure 20 to be releasably secured to the side walls and end wall (or to other support structure or handle structure), It is also within the scope of this invention for the reticulated structure to be emplaced within a framework or a walled structure.

The outer edge 28 of the plate member 26 may be tapered, rounded, pointed, or any desirable configuration for facilitating its insertion into a mass of litter.

Figure 10:
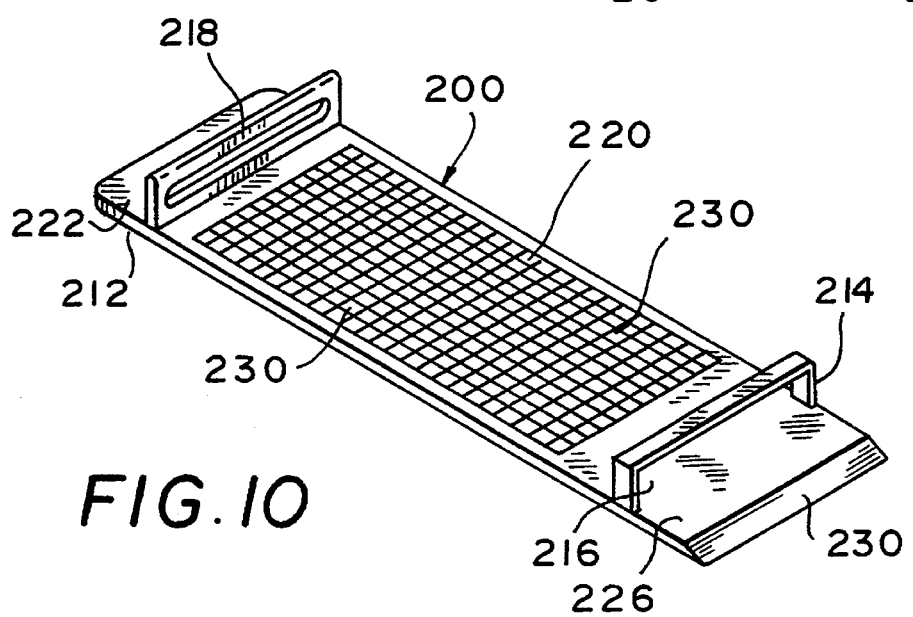
FIG. 10 is a perspective view of another waste removal device according to the present invention.

FIG. 10 discloses a waste removal device 200 according to the present invention with a reticulated grid 220 with a plurality of openings 230 therethrough. At one end of the grid 220 a plate member 226 with a tapered end 230 is positioned to facilitate entry of the device into a mass of litter. At the other end of the device is a first upright handle 212 with a hole 218 therethrough. An end member 222 extends from the end of the device 200. Another upright handle 214 at the other end of the device has an opening 216 thereunder for the passage therethrough of litter material.

Figure 8:
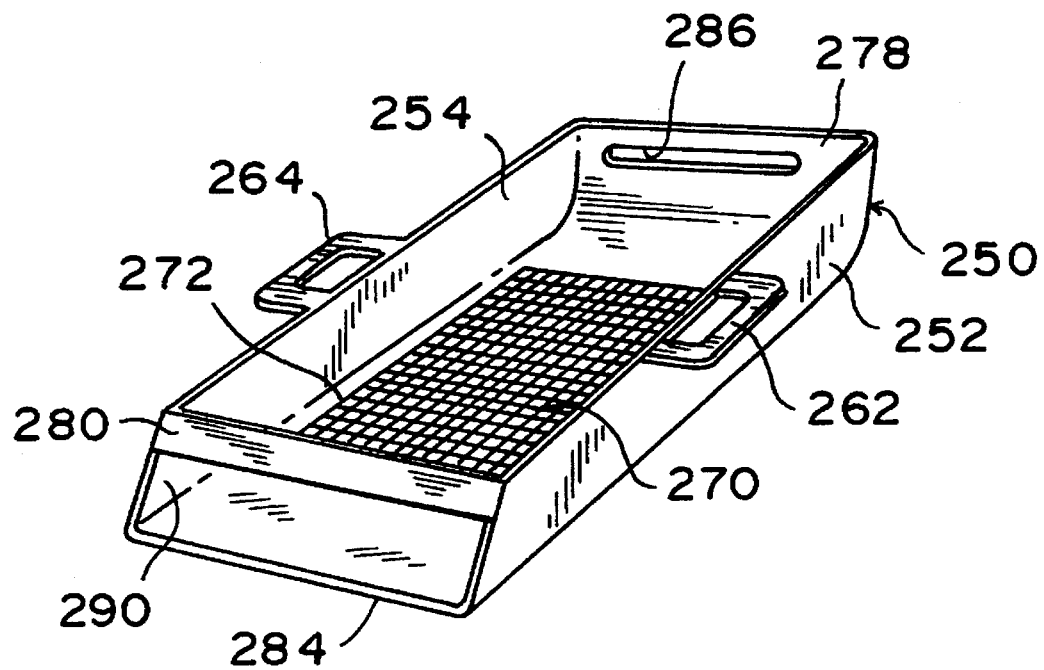
FIG. 8 is a perspective view of another waste removal device according to the present invention.

FIG. 8 discloses a waste removal apparatus 250 according to the present invention with two side walls 252, 254, with handles 262 and 264, respectively; bottom member 272 with a bottom reticulated structure 270, and end member 278, and an end support bar 280. The side walls 252, 254; bottom member 272 and end support bar 280 define an opening 290 for facilitation of emplacement of the device 250 in a mass of litter. A handle opening 286 is provided in the end member 278. A tapered end tip 284 of the bottom member 272 also facilitates emplacement into a litter mass. The end support bar 280 may serve as a handle and may have an opening (not shown) like the opening 286.

No particular species shown in any particular drawing herein is to be limited to the aspects shown in that particular drawing. Embodiments according to this invention are disclosed here which may incorporate one or more aspects of two or more particular disclosed species. For example (but not limited to) the embodiment of FIG. 1 may have a cut-out end handle as in the embodiment of FIGS. 8 or 9 and/or an end support bar as in the embodiment of FIG. 8 and/or one or more weights on the body member or on the reticulated structure. Similarly e.g. the embodiment of FIG. 8 may have a removable reticulated structure as does the embodiment of FIG. 1.

For each embodiment described above when used with clumping litter material, it is preferred that the litter material comprises material which agglomerates into waste-litter agglomerates with a largest dimension larger than a largest dimension of components (granules, pieces, fibers, etc.) of the litter material, and that the reticulated structure has openings sized so that the reticulated structure, upon removal from the mass of litter material, retains thereon the waste-litter agglomerates while allowing non-agglomerated litter components to pass therethrough back into the mass of litter material.

In conclusion, therefore, it is seen that the present invention and the embodiments disclosed herein and those covered by the appended claims are well adapted to carry out the objectives and obtain the ends set forth. Certain changes can be made in the subject matter described, shown and claimed without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A waste removal apparatus for removing animal waste from a mass of litter material, the apparatus comprising a body member having two opposed spaced apart sides and an open end, a bottom member interconnected between the two sides, an end member interconnected between the two sides, a reticulated structure in the bottom member, an end of each side and an end of the bottom member defining the open end of the body member, the open end of the body member facilitating introduction of the apparatus into a mass of litter material, the reticulated structure having openings sized so that the reticulated structure, upon removal from the mass of litter material, for retaining thereon waste-litter agglomerates while allowing non-agglomerated litter components to pass therethrough back into the mass of litter material, an end support bar extending between the two sides at the open end of the body member, the end support bar, two sides, and bottom member defining an end opening through which litter material can pass into the apparatus, and at least one weight member attached to the body member to inhibit a tendency of the mass of litter material to push upwardly.

2. The apparatus of claim 1 wherein the reticulated structure has two spaced apart ends mid removably secured to the bottom member, and the at least one weight member is two weight members attached to the reticulated structure, one at each end thereof.

* * * * *